Patented June 3, 1952

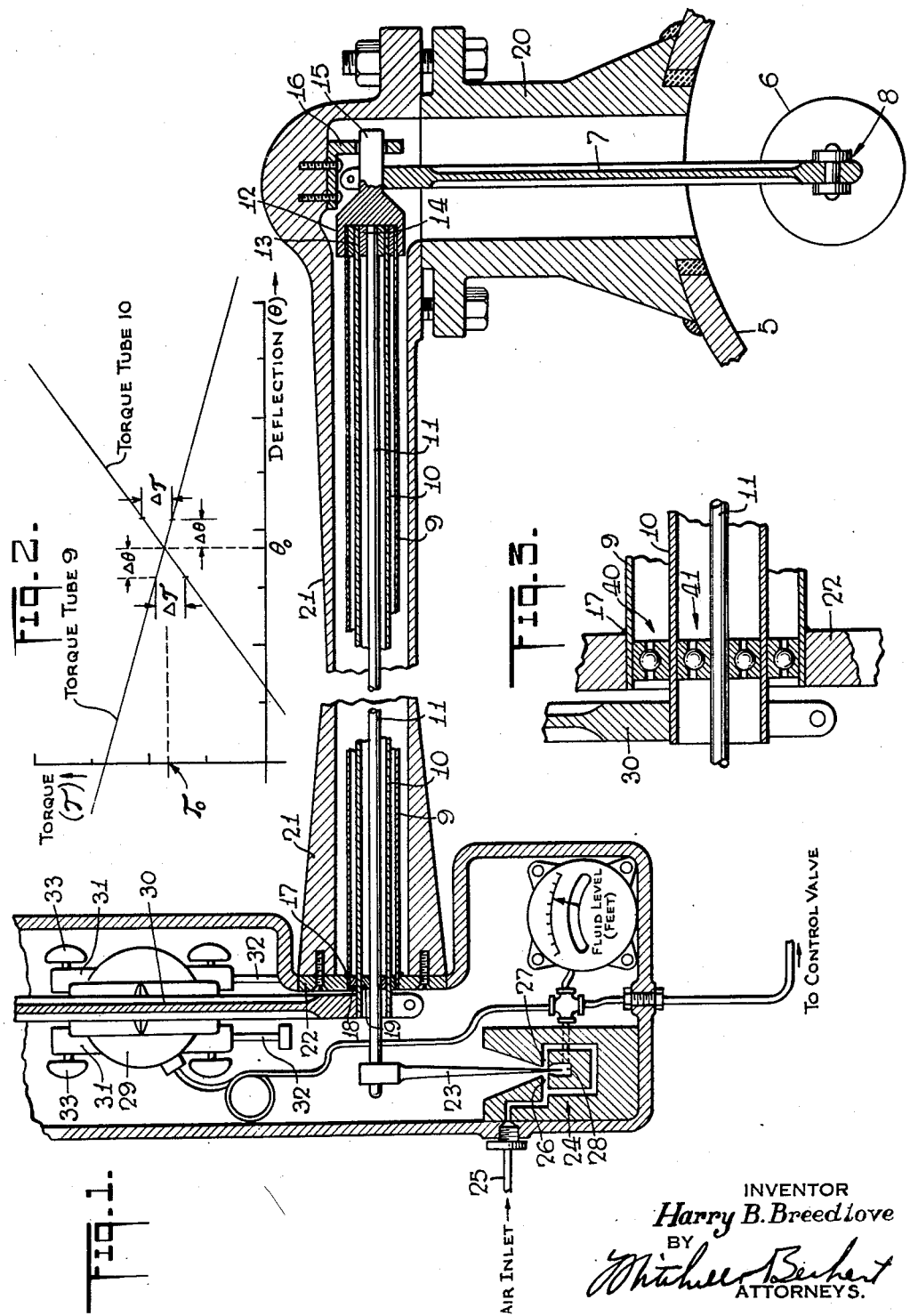

2,599,159

UNITED STATES PATENT OFFICE 2,599,159

LIQUID LEVEL AND FLOW CONTROL

Harry B. Breedlove, Baton Rouge, La.

Application September 13, 1946, Serial No. 696,741

8 Claims. (Cl. 137—139)

My invention relates to control instruments and devices, and in particular to improved so-called null-finding mechanisms.

Frequently in the precise control of systems or mediums under pressure, valves or other components are under different pressures, and it becomes necessary to transmit forces existing in one medium or under one pressure to another component or medium under another pressure. Although the forces transmitted may be relatively large, the inherent friction or resistance drag on the force-transmitting mechanism (particularly at the border between the pressure mediums) will in a large measure determine the response of the system to small increments of force or motion. In a servo or feed-back system in which the system components are under different pressures, these drags are particularly important and may undesirably affect system sensitivity and stability.

It is, accordingly, a general object of my invention to provide an improved instrument of the character indicated.

It is another object of the invention to provide an improved mechanism for the substantially frictionless effective transmission of a force or motion from one medium which may be under a first pressure to a second medium which may be under a second pressure.

Another object is to provide an improved null-type measuring instrument of high inherent sensitivity.

It is also an object to provide measuring instruments having improved means for calibration.

Other objects and various further features of the invention will hereinafter be pointed out or will occur to those skilled in the art from a reading of the following specification in conjunction with the accompanying drawings. In said drawings:

Fig. 1 is a sectionalized view of a null-type instrument incorporating features of my invention;

Fig. 2 is a graph serving to illustrate a function of the apparatus of Fig. 1; and Fig. 3 is an enlarged fragmentary sectional view of an alternative construction for a portion of the apparatus of Fig. 1.

Broadly speaking, my invention contemplates the automatic and substantially frictionless measurement, control, amplification, and effective transmission of forces, particularly through a barrier across which there may exist a pressure differential. The force to be measured is caused to deflect the common secured end of three generally cylindrical members which are free to rotate with respect to each other at their other ends. One of these members is torsionally flexible and is secured against rotation (as by attachment to a frame or other reference member) at said other end. Amplifier means in the form of a valve connected to an external source of pressure may respond to angular displacement of a second of these members at said other end, and the output of this valve or amplifier means may be applied to a suitably responsive device connected to the third member to set up a torque tending to overcome that attributable to the force to be measured. Readings may then be made of the balancing pressures or other amplified quantity required in the responsive device, and these quantities are indicative of the unknown forces.

In the specific form to be described, the three members are substantially coaxial, and the outer of these members is secured to the barrier or wall separating two mediums which may be under different pressures. Also, the first or common end of the three members is capped or otherwise sealed off whereby no pressure leakages can occur between the members. To simplify problems of calibration, adjustable moment means are provided between the pressure-responsive device and the third member, whereby known torques or forces may be caused to give desired scale readings on an indicating meter.

Referring to the drawings, my invention is shown in application to a system in which it is desired to operate a control valve in response to changes in fluid level within a vessel 5 under pressure or evacuated (with respect to the atmosphere outside the vessel). A float 6 is partially immersed in the fluid, and, depending upon the fluid level, various buoyant forces will be set up in the float 6. These forces are translated into torques by means of a crank 7 linked as at 8 to the float 6 and fixed at the other end to my novel torsionally flexible suspension.

In accordance with a feature of the invention, the forces or torques to be measured are received by a system of three preferably coaxial members 9, 10, and 11. At one end all three of these members 9, 10, and 11 are secured together as by a circumferentially extending yoke 12 and bushings 13—14. In the form shown, the yoke 12 includes a stud portion 15 to which the crank 7 is securely fixed and which may serve pivotally to carry the torsional suspension in a journal or bearing 16.

The other ends of the torsional suspension members 9, 10 and 11 are preferably free to rotate with respect to each other. In the form shown, the outermost of these members 9 is torsionally flexible and secured against rotation as by a circumferential seal or weld 17 to a frame or reference member. Loose and substantially frictionless bearing elements or bushings 18 and 19 may serve coaxially to position the free ends of the cylindrical members, as will be clear. The torsion members 9—10 preferably have substantially the same stiffness coefficients, although, as pointed out below, these coefficients may differ without impairing operation of my device.

For purposes of maintaining the pressures existing within the vessel 5, the crank 7 and the torsion suspension 9—10—11 may be housed in a continuous enveloping extension of the vessel 5. In the form shown, this extension comprises a first hollow cylindrical portion 20 embracing the crank 7, and a second hollow generally cylindrical portion 21 embracing the torsion suspension. Suitable sealing means such as gaskets (not shown) may be employed to seal off joints of the various extension members to the vessel 5 and to each other. The vessel 5 will then be understood to comprise a leak-proof system including a wall 5, the extensions 20 and 21, an annular end plate 22 (which may be fitted to or a part of the extension 21), the outermost tubular member 9, and the cap or yoke 12. Pressures within the flexible members 9 and 10 will be understood to reflect prevailing external atmospheric or other conditions.

In the form shown, the free end of the innermost member 11 of the torsional suspension supports the control element 23 of an air-jet pilot valve 24, operating from a preferably well-regulated external supply of air entering the valve through an inlet 25. The passageway structure within the valve 24 provides a pair of opposed jets 26—27 at the relatively restricted open end of an outlet chamber 28. By virtue of the contour of the control element 23, the angular disposition of control element 23 may determine the volume of jet air which will be bled to the atmosphere; this action in turn may determine pressure existing within the outlet chamber 28.

The pressure within the outlet chamber 28 is supplied to a pressure-responsive device 29 which will transform pressures into mechanical displacements, for subsequent conversion into counterbalancing torques. These torques may be derived by application of these mechanical displacements to a crank 30 fixed to the intermediate tubular member 10. Tubular member 10 preferably operates in a sense to oppose deflections caused by buoyant forces on the float 6.

In the form shown, the pressure-responsive device 29 is a Sylphon-type bellows mounted upon a suitable carriage member 31 in engagement with track or guide members 32 for adjustment generally longitudinally of the crank 30. Setscrews 33 may serve to anchor the pressure-responsive means 29 in a desired calibrated position with respect to the axis of the torsion suspension, as will be clear.

In operation it will be appreciated that an initial rise in fluid level within the vessel 5 may cause such an increment in the buoyancy of float 6 as torsionally to deflect all three of the members 9, 10 and 11 in a clockwise sense (viewed right to left in Fig. 1). Since the suspension of the valve-control element 23 on the inner coaxial member 11 is such as to encounter relatively insignificant torsional-friction resistance, angular deflection of the control element 23 (and hence operating pressure within the outlet chamber 28) will very definitely and immediately reflect the angular deflection of the yoke 12 and hence of the small increase in fluid level. The new pressure within the outlet chamber 28 is communicated directly to the pressure-responsive device 29 for substantially immediate application of a corrective torque, as applied via the intermediate and preferably torsionally flexible member 10.

It will be appreciated, then, that the initial flexing of the torsional suspension constituted primarily a stressing of the outer torsionally flexible member 9, and that the corrective or balancing forces applied through crank 30 effected a corresponding stressing of the flexible member 10 in an opposed sense. An equilibrium resulted when the correctively flexed member 10 supplied a torque equal and opposite to that to which the outer member 9 was subjected. As a matter of practice, this equilibrium position will very nearly correspond (angularly, at the capped end 12) to an at-rest or normal position, the only difference being a slight angular cocking of the crank 7 necessary to deflect control element 23 enough to supply a balancing corrective pressure in the pressure-responsive bellows 29, as will be clear.

The above résumé of operation may be more clearly understood by referring to the diagram of Fig. 2 in which the torque 9 and the torque 10 are shown to have comparable, although not equal, stiffness coefficients—that is, a given deflection $\theta$ of one of these tubes may be obtained with a given torque $\tau$, whereas the same torque applied to the other tube would produce a slightly different deflection $\theta'$. The fact that these characteristics are slightly different need not impair the operation of my device, for as indicated above an equilibrium is either in existence or very transiently being sought. For equilibrium, the torque tubes 9 and 10 are balanced and, therefore, operation is at the intersection of the two characteristics shown $(\tau_0; \theta_0)$. It might be argued that in order to maintain a balancing pressure in the bellows 29, the control element 23 must be angularly displaced by an amount $\Delta\theta$ from its normal or at-rest position and that, therefore, the transmission of balancing torques is opposed by a resistive force derived from the difference in torques $\Delta\tau$ existing for this condition. As a practical matter, however, these displacements $\Delta\theta$ are so small as to render insignificant any resistive torques $\Delta\tau$ that might be attributed to a lack of exact balance between torques in the torque tubes 9 and 10. Furthermore, the tube characteristics being linear (in the region under discussion), the difference between the characteristics is linear and, hence, readily correctible in an initial calibration.

For extreme flexibility characterized by minimum frictional drag on relative rotation of the free ends of members 9—10—11, I show in Fig. 3 how anti-friction bearing means may be applied for radial positioning of these free ends. In this arrangement, a first anti-friction bearing 40 may be fitted between torque tubes 9 and 10, and a second anti-friction bearing 41 may be utilized to support the pilot-control rod 11 within torque tube 10.

It will be appreciated that I have disclosed a relatively simple means for the relatively frictionless transmission of forces through a boundary between one medium and another. The arrangement is in a sense the equivalent of stuffing-boxes, without the drags necessarily associated with the latter. Although the invention has been described in application to a float-valve liquid-level meter or controller, it is clearly also applicable to any arrangement in which a force or torque or in which a quantity convertible into a force or torque is to be transmitted, measured, or utilized to effect a controlling operation.

While I have described my invention in detail for the preferred forms shown, it is to be understood that various changes and modifications may be made within the scope of the invention as defined in the claims which follow.

I claim:

1. In a force-compensating device, a frame member, three generally coaxial members secured to each other near one end of said coaxial members, means securing the other end of one of said coaxial members to said frame member, bearing means supporting the other two of said coaxial members for substantially free angular displacement with respect to said one coaxial member and with respect to each other at said other end, means for angularly deflecting said one end of said coaxial members with respect to said frame member, valve means responsive to angular displacement of one of said two other coaxial members, and pressure-responsive means responsive to control by said valve means and in torque transmitting actuating relation with the second of said two other coaxial members.

2. A device according to claim 1, in which a pressure-responsive indicating meter is in fluid communication with said valve means.

3. In a device for transmitting an indication of the magnitude of a force, three generally coaxial members secured to each other at one end and rotationally free of each other at the other end, two of said members being tubular and torsionally flexible, means securing one of said two members against rotation at said other end, pressure-responsive means connected to the other of said two members at said other end, said connection being such as to apply torque to said other member in a sense opposed to torque applied to said one member, and valve means responsive to angular displacement of the third of said members and in fluid communication with said pressure-responsive means.

4. A device according to claim 3, in which adjustable means are provided between said pressure-responsive means and the other of said two members, whereby the response characteristic of said pressure-responsive means in cooperation with said other member may be adjustably varied.

5. In a device for transmitting an indication of the magnitude of a force, two torsionally flexible members secured to each other at one end and free to rotate with respect to each other at the other end, means securing one of said flexible members against rotation at said other end, valve means connected to said one end and responsive to an angular displacement of said one end, and pressure-responsive means connected to the outlet of said valve means and in torque-transmitting relation with a point at said other end of the other of said flexible members.

6. In a means for transmitting movement, three generally coaxial members secured together at a first point, means for securing one of said members against rotation at a second point axially spaced from said first point, whereby angular movement transmitted to said members at said first point will be transmitted through a second of said members, means at a second point on the third of said members for applying a torque in opposition to said movement whereby upon a balancing of the torque in said first member against the torque in said third member said second member may be subjected to negligible net angular movement more or less regardless of the torque applied at said first point.

7. A device according to claim 5, in which said connection to said other flexible member includes adjustable moment means for adjusting the magnitude of torque applied to said other flexible member for a given pressure supplied to said pressure-responsive means.

8. In a null-type instrument of the character indicated, three members including two torsionally flexible members secured against relative rotation at a first point along the length of said members, one of said flexible members including a second point spaced from said first point, at which second point said one flexible member is secured against rotation, torque-amplifier means responsive to angular deflections of the third of said members, means responsive to said torque-amplifier means and connected to a second point on the other of said flexible members to apply torques in a sense opposing said deflections, means for supplying to said amplifier means angular deflections of said third member, whereby said amplifier means may be utilized to effect a controlling function in response to a torque applied to said members at said first points.

HARRY B. BREEDLOVE.

REFERENCES CITED

The following references are of record in the file of this patent:

UNITED STATES PATENTS

| Number | Name | Date |
| --- | --- | --- |
| 858,557 | Banning | July 2, 1907 |
| 1,173,038 | Roschanek | Feb. 22, 1916 |
| 1,966,537 | Binckley | July 17, 1934 |
| 2,248,322 | Annin | July 8, 1941 |
| 2,263,771 | Griffey | Nov. 25, 1941 |
| 2,353,641 | Brockett | July 18, 1944 |